United States Patent [19]
Shannahan

[11] Patent Number: 4,822,586
[45] Date of Patent: Apr. 18, 1989

[54] AMMONIA SYNTHESIS METHOD

[76] Inventor: Cornelius E. Shannahan, 1 Hilltop Cir., Chappaqua, N.Y. 10514

[21] Appl. No.: 230,312

[22] Filed: Aug. 9, 1988

Related U.S. Application Data

[63] Continuation-in-part of Ser. No. 8,776, Jan. 30, 1987, which is a continuation-in-part of Ser. No. 866,203, May 21, 1986.

[51] Int. Cl.$^4$ ................................. C01C 1/04
[52] U.S. Cl. ..................... 423/359; 423/362
[58] Field of Search .............. 423/359, 362

[56] References Cited

U.S. PATENT DOCUMENTS

| | | | |
|---|---|---|---|
| 1,158,167 | 10/1915 | Bosch et al. | 423/362 |
| 1,225,755 | 5/1917 | Bosch et al. | 423/362 |
| 1,844,963 | 2/1932 | Larson | 423/363 |
| 3,002,816 | 10/1961 | Friend et al. | 422/191 |
| 3,304,249 | 2/1967 | Katz | 204/164 |
| 4,148,866 | 4/1979 | Becker | 423/359 |
| 4,213,954 | 7/1980 | Pinto | 423/359 |
| 4,235,749 | 11/1980 | Gens | 423/363 |
| 4,376,758 | 3/1983 | Pagani et al. | 423/359 |
| 4,411,877 | 10/1983 | Notman | 423/359 |
| 4,536,380 | 8/1985 | Pirkle, Jr. et al. | 423/359 |

FOREIGN PATENT DOCUMENTS

| | | | |
|---|---|---|---|
| 1924892 | 11/1969 | Fed. Rep. of Germany | 423/359 |
| 274904 | 5/1928 | United Kingdom | 423/362 |
| 1148513 | 4/1969 | United Kingdom | 423/362 |

OTHER PUBLICATIONS

Leva, *Fluidization* (1959) McGraw-Hill Book Company, Inc., pp. 1-8.
Quartulli et al., "Best Pressure for NH$_3$ Plants?", *Hydrocarbon Processing* (Sep., 1972), pp. 3-11.

Primary Examiner—John Doll
Assistant Examiner—Wayne A. Langel
Attorney, Agent, or Firm—Victor E. Libert

[57] ABSTRACT

A process for producing ammonia by reaction of a hydrogen and nitrogen-containing synthesis gas in the presence of a solid particulate catalyst for the reaction, includes conducting the reaction at pressures significantly lower than that of conventional ammonia synthesis, e.g., at about 30 to 70 atmospheres, in a fluidized bed of the catalyst. The synthesis gas is used to fluidize the catalyst and the resultant fluidized bed is preferably maintained under substantially isothermal conditions, e.g., by flowing a coolant liquid in indirect heat exchange relationship with the fluidized bed. Suitable catalysts for the process include activated iron catalysts which may be of very fine particle size.

9 Claims, 1 Drawing Sheet

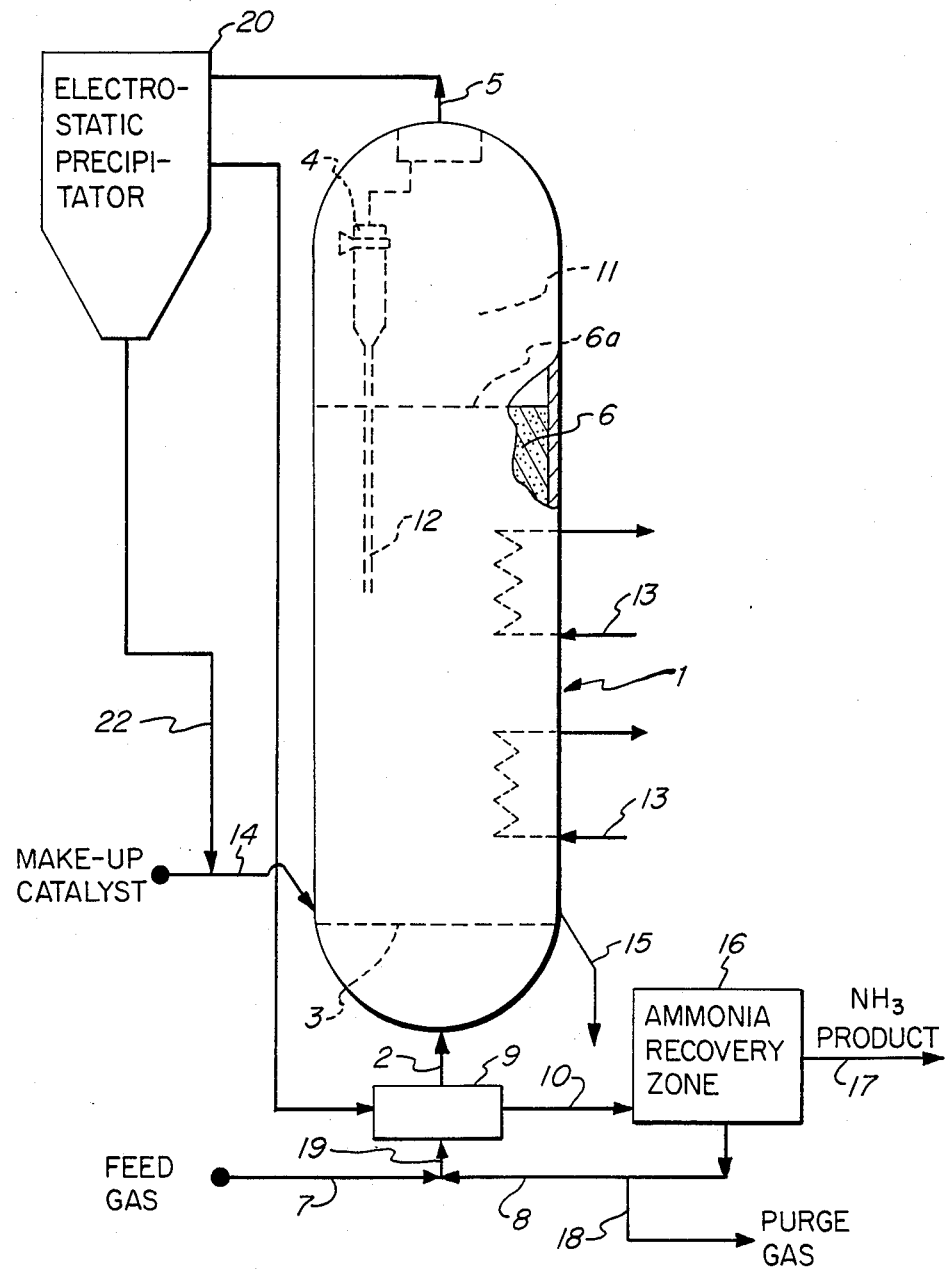

AMMONIA SYNTHESIS METHOD

BACKGROUND OF THE INVENTION

RELATED APPLICATION

This application is a continuation-in-part of application Ser. No. 008,776, filed Jan. 30, 1987 in the name of Cornelius E. Shannahan and entitled "Ammonia Synthesis Method", now abandoned which in turn is a continuation-in-part of application Ser. No. 866,203, filed May 21, 1986 in the name of Cornelius E. Shannahan and entitled "Fluidized Bed Ammonia Synthesis Method" now abandoned.

FIELD OF THE INVENTION

The present invention generally relates to ammonia synthesis processes, wherein hydrogen and nitrogen are catalytically reacted at elevated temperature and pressure to produce ammonia.

DESCRIPTION OF THE RELATED ART

The synthesis of ammonia by a catalyzed reaction of hydrogen with nitrogen at elevated pressure and temperature has long been used for the commercial production of ammonia because of the simplicity of the reaction, which is highly selective in that no by-products are formed. Despite its simplicity and the absence of deleterious reaction by-products, the ammonia synthesis reaction is intrinsically limited by thermodynamic equilibrium and kinetic constraints and is favored by operation at high pressure and low temperature. The effects of varying process conditions on the ammonia synthesis reaction have been extensively studied by numerous investigators, as summarized for example in "An Investigation On Promoted Iron Catalysts For The Synthesis Of Ammonia", Anders Nielsen, The Haldor Topsoe Research Laboratory, 3rd Edition, and in *Fertilizer Science and Technology*, Volume 2, Part III, "Ammonia".

In commercial synthesis systems, various ammonia synthesis catalysts are utilized in fixed beds through which the hydrogen and nitrogen reactants are flowered. Contaminants or inert gases in the hydrogen- and nitrogen-containing feed gas, if present in excessive amounts, may adversely affect catalyst activity or dilute the reaction mass sufficiently to lower the kinetics and yield of product ammonia. Where the unreacted hydrogen and nitrogen are recycled after ammonia is recovered from the product effluent gas, such contaminants and inerts tend to build up in the system or "synthesis loop". In such systems, high recycle rates are typically employed, and it is necessary to purge feed contaminants from the system in order to limit their concentration in the system. For example, if the mol percent of inerts in the feed to the ammonia synthesis process is increased from 0 percent to 10 percent, with the reaction being carried out at 838° F. and 200 atmospheres pressure, the mol percent yield of ammonia is decreased from 27.8 percent to 22.7 percent.

Another factor is the pressure at which the reaction is carried out; increases in pressure while maintaining reaction temperature constant increase the equilibrium yield of ammonia. For example, at a temperature of 838° F., increasing reaction pressure from 100 to 500 atmospheres increases the percent yield of ammonia from 13.6 percent to 40.3 percent. On the other hand, if pressure is maintained at a uniform value while temperature is increased, the equilibrium yield of ammonia is reduced. For example, at a pressure of 200 atmospheres, increasing the reaction temperature from 694° F. to 968° F. decreases the yield of ammonia from 38.7 to 13.2 percent. The decrease of equilibrium yield of ammonia with increasing temperature is exacerbated by the fact that the ammonia synthesis reaction is highly exothermic in character. Even under advantageous pressure and temperature conditions, comparatively low conversions of ammonia result. As a result many different commercial synthesis reaction system designs have been proposed and implemented.

One approach to removal of the exothermic heat of reaction from the ammonia synthesis reaction system is the use of interstage cooling between multiple fixed beds of catalyst in series, either by injecting cold feed gas between beds or by installing heat exchanges between beds of indirect cooling, or both. Even with the employment of such interstage cooling techniques, the exothermic character of the reaction nonetheless produces temperatures gradients in the fixed catalyst beds on the order of 50°–200° F. or more.

An optimized process design for a commercial fixed bed ammonia synthesis system is disclosed in "Why Horizontal $NH_3$ Converters?", Quartulli and Wagner, *Hydrocarbon Processing*, December, 1978, page 117, wherein the effluent from sequential fixed beds in the system is subjected to quenching with cool feed gas to lower the temperature in the beds. Even with such interstage cooling, fixed catalyst bed temperatures at the bed inlets ranged from 750° to 824° F., while the outlet temperatures were from 880° to 920° F. Such wide temperature variations have a significant effect on ammonia yield and system efficiency, as noted in the aforementioned Nielsen text, in FIGS. 8 and 9 thereof.

It is apparent that such temperature gradients preclude carrying out the reaction at an optimum temperature at all points in the fixed bed.

Another problem with fixed bed designs is the necessity to carefully pack the particulate catalyst within the fixed beds in order to minimize channeling of the reactant gases through the fixed beds. Gas flow channeling occurs when a stream of gas forms a channel through the bed, through which channel the flow rate of the gas increases due to the reduced pressure drop across the channel as compared to the pressure drop across the rest of the bed. Channeling causes a portion of the reactant gases to flow at a high rate through the channel instead of flowing at a slower rate in evenly dispersed contact with the catalyst bed. This results in less contact with the catalyst and consequently lower rates of reaction. In an attempt to overcome such channeling tendencies, it is conventional practice when filling the fixed beds with catalyst to send an operator into the beds to tamp them with a mechanical vibrating tamper in an attempt to attain uniform, firm packing and thereby minimize channeling. This not only requires labor expenditure but due to the construction of the fixed beds it is usually not possible to uniformly tamp the catalyst at all locations and gas channeling through the bed remains a problem in the art of fixed bed ammonia synthesis reactors.

Although various materials have been employed as catalysts in ammonia synthesis, iron-based materials have come into widespread usage due to their relatively low cost and high conversion efficiency. Such catalysts are generally "activated", by which is meant that they are maintained in a reducing atmosphere, e.g., hydrogen, for sufficient time to reduce their iron oxide content to yield a catalyst substantially free of iron oxides. Due to the generally low equilibrium yields of ammonia in ammonia synthesis, catalyst activity is a highly important factor in the economics of the system design and operation. It is known that the activity of the typical commercial iron-based catalysts is increased by decreasing the particle size of the catalyst. Such increase in activity is in part attributable to the reducing conditions present in the activating process, during which reduction of the catalyst particles proceeds in a radially inwardly direction, from the surface of the particle toward the center thereof. When, as is typical, hydrogen is used as the reducing atmosphere, water vapor is formed by combination of hydrogen with the oxygen normally bound to the iron. This water vapor migrates to the surface of the catalyst particles and significantly damages the outer surfaces thereof, so that catalyst activity is significantly diminished. Further, the size of the particulate catalyst material is a factor in such lowering of activity. Specifically, the larger the particle of catalyst, the longer it takes to complete the reduction of the particle and the more damage is inflicted on the reduced catalyst portion of the particle due to the water vapor (steam) released in the reduction. The magnitude of this effect is readily ascertainable by surface area measurements for varying sized catalyst particles; such measurements show that surface area of the catalyst is higher when smaller particles are reduced.

It therefore would appear that significant process improvement can be achieved by reduction of catalyst particle size. Although true, this benefit has only partially been realized to date, due to pressure drop considerations in the fixed bed ammonia synthesis system. Specifically, fixed bed pressure drop is an important consideration in the overall ammonia plant design, since this pressure drop determines the power requirements for recycling unconverted synthesis gas therein, with higher pressure drop being associated with increased horsepower requirements for the recycling operation. In early fixed bed ammonia synthesis designs, a catalyst average particle diameter on the order of from about 6 to about 10 mm was typically employed, although some designs utilized catalyst with an average particle diameter on the order of from about 14 to about 20 mm. Over the years, ammonia synthesis plants have utilized smaller sized catalyst to take advantage of the correspondingly increased catalytic activity. Nonetheless, the literature does not report any instances of commercial ammonia synthesis plants using catalyst having a particle size below about 1.5 to 3 mm diameter.

Attempts to overcome the pressure drop effect associated with small-diameter ammonia synthesis catalyst particles have included modifications of the synthesis reactor to accommodate radial or horizontal flow of the feed gas through shallow fixed beds, but even in such systems catalysts less than about 1.5 to 3 mm in diameter have not been employed. As a result, the high activity benefits of finer (smaller diameter) catalyst have not been realized in the ammonia synthesis systems developed to date, despite their obvious appeal.

Although no commercial ammonia synthesis plants have used catalyst having a particle diameter below about 1.5 to 3 mm, the above-mentioned A. Nielsen article shows in Figure 26 thereof that reducing the catalyst particle size from a range of 1.2 to 2.5 mm to a range of 0.5 to 1.2 mm, effects an 80 percent increase in the kinetic relative activity of the catalyst, at the reported conditions including a temperature of 842° F., a pressure of 317 atmospheres, and a space hourly velocity of 16,000 hr$^{-1}$.

United Kingdom Patent No. 1,148,513, published Apr. 16 1969, granted to D. G. Ivanov et al and entitled "Improvements In Or Relating To The Manufacture Of Ammonia" discloses a method of synthesizing ammonia using a fluidized bed of catalyst particles which are magnetic in nature. A bed of the magnetic particles, advantageously of a particle size of 0.1 to 0.2 mm or 0.2 to 0.3 mm, are fluidized by the synthesis gas containing nitrogen and hydrogen and reacted at an elevated temperature and pressure. A magnetic field, preferably of from 500 to 4000 oersteds (page 2, lines 5-6) is applied to the reaction zone by means of a permanent magnet or preferably an electromagnet placed around the outside of the reaction vessel when the vessel is made of non-magnetic steel or within the reaction vessel when it is made of a magnetically conductive steel. The applied magnetic field is stated to help in lifting the fluidized catalyst particles (page 1, lines 83-85), and to retain the particles in the reaction zone and not allow them to be removed by the flowing gas (page 1, lines 91-94). The patent states that under the conditions of the invention, the catalyst becomes much more active for a given particle size compared to its activity "upon operation in a stationary layer". Optimum operating temperatures are stated to be from 50° to 125° K. lower than those for the same catalyst used "in a stationary layer" under the same conditions. At page 1, lines 28-31 the patentee states that preferably, the reaction is carried out at a pressure substantially greater than atmospheric pressure, and both examples summarized in the Table at page 2 show a pressure of 300 atmospheres.

U.S. Pat. No. 3,304,249 (H. Katz) discloses carrying out chemical reactions in fluidized beds, including the application of an electrical charge to the particulate matter comprising the fluidized bed. The patent discloses, at column 1, lines 18-49, that the turbulent particles of the fluid-ized bed provide excellent contact between the particles and the fluidizing gas and, if there is a temperature difference, excellent heat flow between them (column 1, lines 27-30). At column 2, lines 24 et seq., the patent discloses that a fluidized bed of fluidizable particulate solids having a moderate surface electroconductivity can be stabilized by applying a high voltage to the fluidizing medium in an amount sufficient to ionize at least part of the fluidizing medium and create an electric field throughout the bed. The applied voltage should be sufficient to effect a corona discharge in at least a portion of the bed (column 2, lines 34-36). A "stabilized" fluidized bed is said (column 2, lines 52 et seq.) to mean an expanded fluidized bed in which turbulent motion of the particles and slugging effects produced by the growth of gas bubbles can be completely suppressed.

U.S. Pat. No. 2,818,418 (Rottig, et al) concerns improved catalysts for the catalytic hydrogenation of carbon monoxide in a synthesis which includes the formation of hydrocarbons and alcohols (column 2, line 32 et seq). At column 3, lines 34-44, the patentee states that the process is most suitably carried out with fixed-bed catalysts but "is also applicable to a synthesis with a pulverulent catalyst ('fluidized synthesis')." Reaction conditions disclosed in the patent include temperatures of about 150° to 350° C. and pressures of one to two hundred atmospheres. The patent also states that "use of the catalysts according to the invention for a carbon monoxide hydrogenation in the liquid phase and, above all, in the oily phase is possible in both the pulverulent and granular state." However, all the examples of this patent concern fixed bed processes.

U.S. Pat. No. 4,397,964 discloses an unsupported particulate catalyst stated to be especially useful for methanation reactions (column 1, lines 14–19). At column 9, line 39 et seq, the patent states that in a preferred embodiment, "the particulate unsupported catalyst is used in a catalytic process in a fluidized bed reactor." The patent states that the disclosed catalyst particles are resistant to attrition in the fluidized bed and are readily reactivated. Example 3 at column 14 illustrates the use of the catalyst of the invention in a fluidized bed.

U.S. Pat. No. 2,623,058 discloses catalytic conversion of carbon monoxide with hydrogen employing fluidized catalysts (column 3, lines 15–25).

U.S. Pat. No. 2,779,777 discloses reacting hydrogen and carbon monoxide in a fluidized catalyst bed. The drawings show a fluidized catalyst bed in a reactor cooled by a cooling coil. See column 4, lines 16–20.

U.S. Pat. No. 4,197,418 discloses at column 1, lines 16–20, the use of fluidized catalyst techniques in Fisher-Tropsch synthesis.

U.S. Pat. No. 3,402,999 described the utilization of a fluidized bed reactor in a process for decomposing ammonium chloride to ammonia. See the drawings and column 4, lines 16–31.

SUMMARY OF THE INVENTION

In accordance with the present invention there is provided a process for producing ammonia, the process comprising the following steps. A synthesis gas mixture comprising hydrogen and nitrogen is contacted with a mass of solid, particulate ammonia synthesis catalyst, e.g., an activated iron catalyst, under conditions to fluidize the mass of catalyst. The synthesis gas is passed through a reaction zone in contact with the fluidized catalyst mass, the reaction zone being maintained at an elevated temperature and at a pressure of from about 20 to 100 atmospheres to therein provide a reacted synthesis gas stream. The reacted synthesis gas stream is flowed from the reaction zone to an ammonia recovery zone wherein ammonia produced in the reaction zone is recovered, to provide an ammonia product and an ammonia depleted gas.

In other aspects of the invention the pressure may be maintained within a narrower pressure range, say at a pressure of from about 25 to 90 atmospheres, or at a pressure of from about 30 to 70 atmospheres.

Another aspect of the invention provides for removing entrained particulate catalyst from the reacted synthesis gas leaving the reaction zone by a catalyst recovery step consisting essentially of one or both of mechanical recovery and electrostatic recovery.

Still another aspect of the invention provides for maintaining the catalyst mass in a fluidized state by a fluidization step consisting essentially of controlling the volumetric hourly flow rate of gas through the fluidized mass, and the pressure within the reaction zone.

Other aspects of the invention provide for recycling the ammonia depleted gas to the reaction zone and concurrently introducing fresh synthesis gas to the reaction zone.

Still other aspects of the invention are disclosed in the following Drawing and in the Detailed Description of the Invention and Preferred Embodiments.

BRIEF DESCRIPTION OF THE DRAWING

The sole FIGURE is a schematic diagram, not to scale, of a simplified ammonia synthesis flow chart illustrating one embodiment of the present invention.

DETAILED DESCRIPTION OF THE INVENTION AND PREFERRED EMBODIMENTS

In accordance with the present invention, the ammonia synthesis process is carried out within a pressure range which is low compared to usual ammonia synthesis pressures, and in a fluidized bed wherein the solid catalyst is fluidized by a synthesis gas comprising the hydrogen and nitrogen reactants for the synthesis. Such low pressure, fluidized bed operation of the synthesis system is a substantial advance in the ammonia synthesis art, relative to fixed bed processes, because low pressure operation offers significant savings in capital investment and operating costs for compression of the synthesis gas, and fluidized bed operation is free of the substantial temperature gradients characteristic of fixed bed operation.

While the art has recognized that considerable savings with respect to compression of the synthesis gas could be effectuated by reducing the pressure at which the ammonia synthesis reaction is carried out, the reduction in equilibrium content of ammonia at such reduced pressures established a practical lower limit of about 100 atmospheres for the ammonia synthsis reaction. While ammonia synthesis at pressures as low as 500 psig (34 atmospheres) using fixed bed catalysts have been considered, they have not been put into use because of the requirement for extremely large quantities of catalyst in the fixed beds when operating at such low pressures. The attraction of operating at very low pressures, such as 450 to 500 psig, is that this is often the pressure at which hydrogen gas from hydrocarbon reforming operations is available. If the ammonia synthesis could feasibly be carried out at such low levels, the need to pressurize at least the hydrogen portion of the synthesis gas is eliminated. Generally, as reported in the paper *Ammonia Production Technology - Past, Present and Future*, by O. J. Quartulli and D. Wagener (Dechema Colloquium on Ammonia, Frankfurt, Federal Republic of Germany, January, 1973) "low pressure" ammonia synthesis processes are generally considered to be those falling in the range of 100 to 250 atmospheres; intermediate or medium pressure processes are those in the range of 250 to 400 atmospheres, and high pressure processes are those in which the reaction pressure is above 400 atmospheres, to levels approaching 1000 atmospheres.

Although the prior art exemplified by the above-mentioned UK Patent No. 1,148,513 discloses the utilization of a fluidized bed of catalyst in ammonia synthesis, the difficulty of fluidized bed operation even at the lower end of the pressure range deemed essential for economical ammonia synthesis constrains the utilization of extraordinary measures for the operation. Thus, the UK Patent discloses the imposition of a magnetic field of 500 to 4,000 oersted to help maintain the bed in a fluidized condition and to prevent excessive loss of catalyst particles entrained within the gas at the pressures (300 atmospheres is exemplified in the UK Patent) utilized. Among the difficulties encountered in fluidized bed operations at such high pressure is increased difficulty in separating entrained particles from the high pressure gases due to the relatively high density of the gas as compared to gas densities at significantly lower pressures. Loss of the catalyst from the reaction zone of course represents a problem both in contamination of product and replacement of catalyst in the reaction zone. It has been discovered that, surprisingly, fluidized catalyst bed operation in ammonia synthesis provides advantages as compared to fixed catalyst bed operation which are significant enough to permit lowering the pressure at which the reaction is carried out to levels permitting fluidized bed operation without the utilization of extraordinary measures such as the application of magnetic or electrical fields to the high temperature reaction zone. The fluidized bed is capable of isothermal operation, either intrinsically or as augmented for temperature control by heat exchanging a coolant medium with the fluidized bed, such as indirect heat exchange by flow of coolant liquid, e.g, water, through heat exchange coils disposed in the bed. In the latter case, the coolant liquid removes the exothermic heat of reaction from the fluidized bed, so that the bed may be closely controlled at a desired substantially isothermal temperature throughout its volume. The coolant liquid may be flowed through cooling coils disposed in a closed path passing through the fluidized bed for vaporization of a coolant liquid circulated through the coil and consequent removal of the heat of reaction from the fluidized bed.

Further, the fluidized catalyst as compared to the fixed beds used in conventional ammonia synthesis plants, is free of the pressure drop constraints associated with fixed beds. Specifically, as mentioned, fixed beds have not been able to utilize catalyst having a diameter below about 1.5 mm, since the pressure drop becomes prohibitively high when smaller sized particles are utilized, in a fixed bed, which uneconomically increases the energy requirements for flowing the gases through the beds. This constraint has precluded the use in conventional ammonia plants of small sized catalyst particles, such as otherwise may provide significantly enhanced activity for the synthesis reaction.

The pressure drop/catalyst size constraint is overcome in the fluidized bed of the present invention, wherein the only pressure drop requirement is the balancing of the weight of catalyst particles by the pressure drop of the gas flow through the bed. Accordingly, the process of the present invention is able to utilize catalyst particles of sizes which typically are smaller by a factor of ten or more times than catalyst particles utilized in conventional, fixed bed ammonia plants. As an example, the process of the present invention may be operated with catalyst having an average particle diameter on the order of about 0.060 mm, whereby the catalyst activity and conversion efficiency of the ammonia synthesis reaction are substantially improved over what has heretofore been attainable in commercial practice. The smaller size of catalyst particles is advantageous, and therefore is preferred, but if desired the large particle size catalysts typically used in fixed beds are useable in the fluidized beds of the present invention as long as they can be fluidized under the operating conditions employed.

The process of the present invention may be operated with the catalyst in the form of a fine particulate material to obtain optimum catalytic activity under the process conditions employed. Further, the fluidization of the catalyst particles permits operation at optimum temperature condition to be readily achieved, in a manner which favors uniformity of temperature in the reaction zone provided by the fluidized bed of catalyst, enabling removal of the exothermic heat of reaction by flow of the fluidizing gas through the bed and, if necessary or desirable, indirect heat exchange removal of some of the heat of reaction from the fluidized bed by passing a coolant medium therethrough.

As a result of the foregoing advantages, the process of the invention permits attainment of a satisfactory conversion of hydrogen and nitrogen to ammonia, notwithstanding the use of reaction pressures lower than those conventionally employed, with the result that the recycle gas compressor horsepower and catalyst inventory may be reduced, thereby decreasing equipment and operating costs for the ammonia synthesis plant.

Another advantage of the present invention is that, if desired or necessary, catalyst may be added to and withdrawn from the fluidized bed on a continuous or periodic basis without necessity of a shutdown of the synthesis equipment. Large scale, conventional ammonia plants utilize long-life catalysts which, unless accidentally contaminated, remain in service for years, gradually losing activity. The present invention enables maintaining the activity of the catalyst in the fluidized bed at a predetermined high level simply by replacement with fresh catalyst, as desired or necessary, of a portion of the existing inventory of catalyst in use during normal operation and without interruption.

Referring now to the sole Figure of the drawing, a fluidized bed reactor vessel 1 is provided with an inlet conduit 2 which, after passing through heat exchanger 9 and being heated therein, is then passed to vessel 1 for introduction therein of heated reactant gas comprising the nitrogen and hydrogen reactants for the ammonia synthesis. A feed gas distributor 3 is provided near the bottom inlet portion of the vessel 1 and may be in the form of a plate or pipe grid to facilitate distribution of the feed gas across substantially the entire cross section of vessel 1.

At the top of vessel 1 is a multiple stage cyclone recovery means 4, which functions to recover catalyst particles from the product gas flowing into the upper outlet portion of vessel 1. Outlet conduit 5 communicates the upper end of vessel 1 to heat exchanger 9 which in turn is connected to product gas conduit 10, in turn connected to ammonia recovery zone 16. Ammonia gas conduit 17 leads from recovery zone 16 as does recycle gas line 8. A feed line 7 and recycle gas line 8 are connected to inlet conduit 22 which leads into heat exchanger 9. A purge gas line 21 leads from recycle gas line 8.

Vessel 1 contains a fluidized bed of catalyst 6 which may be a conventional activated iron catalyst, substantially free of iron oxides as described above under "Description of Related Art". A suitable catalyst may be a solid particulate catalyst comprising particles having a particle size (diameter) of less than about 1.5 mm, preferably less than about 0.25 mm, and a particle size distribution such that at least about 90 weight percent of the particles have a diameter not greater than about 3 mm, preferably not greater than about 0.5 mm. A suitable range of particle sizes useful in the practice of the present invention is from about 0.005 to about 1.5 mm, preferably 0.01 to about 1.2 mm, more preferably from about 0.02 to about 1.0 mm, and most preferably from about 0.04 to about 0.8 mm. For example, a suitable catalyst may be an activated iron-based catalyst having an average particle diameter on the order of about 0.06 mm.

Extending into the fluidized bed 6 of catalyst particles, the top of bed 6 being indicated within vessel 1 by dotted line 6a, is a cyclone dip leg 12 of the multiple stage cyclone recovery means 4. An electrostatic precipitation zone 20 is provided and outlet conduit 5 is connected thereto and thence to heat exchanger 9. Within the fluidized bed of catalyst 6 there is also disposed cooling coils 13 joined in flow communication with a source of coolant liquid (not shown), each cooling coil defining a closed path through the fluidized bed. At the lower portion of the vessel 1 is a catalyst discharge line 15, which may be used in the known manner to intermittently withdraw from the vessel 1 a quantity of catalyst which is replaced by makeup catalyst introduced through line 14.

In operation of the system, feed gas comprising hydrogen and nitrogen, preferably in a stoichiometric 3:1 volumetric ratio of hydrogen to nitrogen, is introduced to the system via feed line 7, and joined with ammonia-depleted unreacted recycle gas in gas line 8 to form a combined feed stream in conduit 19. The combined stream is passed through heat exchanger 9 in indirect heat exchange relationship with the reaction product gas from outlet conduit 5, the latter subsequently being discharged from heat exchanger 9 in product gas conduit 10 to the ammonia recovery zone 16.

As a result of the indirect heat exchange in heat exchanger 9, the feed gas stream from conduit 19 is heated to elevated temperature, while the product gas from outlet conduit 5, initially at high temperature due to the exothermic character of the synthesis reaction, is cooled to recover a portion of its heat content and passes via product gas conduit 10 at significantly reduced temperature to ammonia recovery zone 16.

The heated feed gas stream passes through inlet conduit 2 and enters vessel 1 at the lower portion thereof where it is distributed across the vessel cross-section by means of feed gas distributor 3. The feed gas is introduced at sufficient volumetric flow rate and superficial velocity to fluidize the bed of solid catalyst 6 within the vessel and thereby form a fluidized bed 6 of catalyst. In the fluidized bed 6, the hydrogen and nitrogen reactants in the feed gas are contacted with the solid catalyst particles in the fluidized bed 6 to react and form ammonia. The reaction product gas, comprising ammonia and unreacted hydrogen and nitrogen (and any inerts introduced by the feed) is discharged into the disengagement space 11 of vessel 1 where entrained catalyst solids in the reaction product gas stream are removed by passage of the reaction product gas stream through the multiple stage cyclone recovery means 4. Collected entrainment solids are returned to the fluidized bed 6 via dip leg 12, and solids-depleted product gas is discharged from vessel 1 via outlet conduit 5. Catalyst particles which may escape cyclone recovery means 4 are recovered in electrostatic precipitator 20 and the recovered catalyst may be returned to reactor 1 via line 22 to make up catalyst line 14. The nature of the entrained solids separation means is not critical and any suitable mechanical or electrostatic precipitation apparatus, of which multiple stage cyclones are one example, could be employed. For example, a series of porous metal filters could be positioned in the disengagement space of the vessel, in a known fashion. The present invention does not require the use of extraordinary means, such as the imposition of magnetic fields or electrical fields on the reaction zone catalyst, either to recover the catalyst or keep it in the reaction zone, or to maintain the bed in a fluidized condition. Thus, the removal of entrained particulate catalyst from the reaction product gas stream leaving the reaction zone is effectuated in a catalyst recovery step consisting essentially of one or both of mechanical recovery (e.g., cyclone separation, filters) and electrostatic recovery (applying an electrostatic charge to the catalyst particles). Fluidization of the catalyst bed or mass is preferably attained solely by the flow of synthesis gas through the bed or mass of catalyst, i.e., by controlling the volumetric hourly flow rate of gas through the fluidized bed or mass, and the pressure within the reaction zone.

The product gas stream discharged from the vessel in outlet conduit 5 is passed through heat exchanger 9 into product gas conduit 10 as previously described and into the ammonia recovery zone 16 which may utilize any suitable system for recovery of ammonia from the reaction product gas as is well known in the art. For example, ammonia recovery zone 16 may employ adsorption with adsorbent materials such as molecular sieves, liquid scrubbing of the reaction product gas with a scrubbing liquid in which the ammonia is highly soluble, followed by separation of the solubilized ammonia from the scrubbing liquid, or any other suitable process or combination of processes whereby ammonia is separated from the unreacted components of the gas. The recovered ammonia product is discharged from recovery zone 16 by ammonia gas conduit 17 and passed to suitable storage or other processes (not shown).

The unreacted hydrogen and nitrogen-containing gas produced by ammonia recovery in the ammonia recovery zone 16 is recycled in gas line 8 for joining with the synthesis feed gas from feed line 7. A portion of the recycled gas is vented from gas line 8 via purge gas line 18 to discharge a purge gas from the system to thereby control the build-up of inerts in the synthesis loop, as is well known to those skilled in the art.

During the operation of the process, if desired, a portion of the catalyst inventory may be replaced by fresh catalyst to maintain or enhance the level of catalytic activity. To do so, fresh catalyst is added to vessel 1 by catalyst line 14 and spent catalyst may be withdrawn from the vessel by catalyst discharge line 15. Although not specifically shown, the specific mechanism of solids introduction and removal from the vessel in respective lines 14 and 15 may entail the use of any suitable means, e.g., lock-hopper means, introduction and withdrawal wells, etc.

Within vessel 1, the ammonia synthesis reaction may be carried out at varying conditions. In general, suitable process conditions include temperatures on the order of from about 600° to about 1100° F., pressures on the order of from about 20 to about 100 atmospheres, and superficial gas velocities of the fluidizing synthesis gas of from about 0.5 to about 5.0 ft/sec.

As indicated, the low pressure, fluidized bed operation of the invention facilitates uniformity in temperature throughout the reaction mass of the fluidized bed, and preferably the fluidized bed is maintained under substantially isothermal conditions. While such preferred isothermal operation may be carried out without heat exchange between the fluidized bed 6 and an external coolant medium, it may be desirable in some cases to carry out indirect heat transfer from the fluidized bed to a coolant liquid, e.g. water, circulated in one or more cooling coils submerged in the bed. It is generally desirable to recover some of the sensible heat of the reacted synthesis gas by indirect heat exchange with the feed gas stream passed to the reaction vessel.

The catalyst bed fluidizing conditions may vary widely, depending on the specific synthesis system, so that the fluidized bed operation may comprise dense phase fluidization, dilute phase fluidization, or any other fluidization flow regime which is suitable in the specific system application being utilized.

In comparison to the conventional high pressure, fixed bed processes of the prior art, the low pressure, fluidized bed process of the present invention affords numerous advantages. Areas of improvement include potential elimination of the synthesis gas compressor because the lower operating pressures may be able to use synthesis gas at available pressure, reduction of refrigeration compressor horsepower (due to the substantially isothermal operation of which the fluidized bed process is capable), lower operating pressures in the reforming and feed gas preparation portions of the ammonia synthesis plant, and a simpler, stabler and more economic synthesis reactor.

The specific process design of ammonia plants adapted to carry out the process of the present invention may vary widely insofar as the features and process variables involved, such process variables including temperature, pressure, space velocity, flow rates, composition of the synthesis feed gas, and amount of inerts therein and the method employed to remove inerts from the synthesis loop, catalyst activity, catalyst particle size, the method of separating ammonia from the effluent gas from the reactor vessel, and the method of removal of the exothermic heat of the synthesis reaction. Specifically, the kinetics of the synthesis reaction depends on space velocity of the gas flow through the reaction system, catalyst activity, temperature and the degree to which ammonia conversion approaches the thermodynamic equilibrium value for the process conditions. The thermodynamic equilibrium ammonia content in turn depends upon temperature, pressure and the amount of the inerts in the reaction product gas. It will be appreciated by those skilled in the art that the numerous process variables involved may be varied within wide limits to achieve optimal system performance in a given application of the process of the invention.

In the practice of the present invention, advantage can be taken of the high activity of fine (small diameter) catalysts, since the catalyst fineness does not, as in the case of fixed bed reactors, affect the pressure drop through the fluidized bed, which depends only on the weight of the fluidized catalyst in the bed and the cross-sectional area of the bed. The type of catalyst employed in the process may vary widely, with iron-based catalysts being preferred, and preferably being of small diameter particles, most preferably with the previously described average particle size ranges and maximum preferred values. A preferred activated iron-based catalyst may have a solid density (measured without voids) of 6.39 gm/cc; a true particle density (with voids) of 3.73 gm/cc; a pore volume of 0.11 cc/gm; and a particle size distribution as follows: 0–20 microns, 5 weight percent; 20–40 microns, 20 weight percent; 40–80 microns, 40 weight percent; 80 microns and above, 35 weight percent. (The term "weight percent" as used herein and in the claims with reference to particle size distribution, means percent by weight of the sample which is made up of particles of the indicated size range.) The foregoing distribution yields an average particle size for the catalyst of about 60 microns, which is generally less than one tenth of the smallest catalyst size utilized in conventional fixed bed ammonia synthesis plants. Conventionally, catalysts are ground such that at least about 90 weight percent of the catalyst comprises particles which are of a diameter not more than about twice the average diameter. Usually, at least about 95 weight percent are coarser than about one-third of the average particle size. Those skilled in the art will appreciate that the particle size range results from the size reduction technique and equipment employed in a given case. The ability to employ in a fluidized bed catalyst particles much finer than those employable in a fixed bed provides a substantial increase in catalyst activity, the benefit of which has not heretofore been realized due to pressure drop constraints associated with fixed bed units.

The features and advantages of one embodiment of the present invention are illustrated with respect to the following non-limiting Example, wherein all parts and percentages are by weight, unless otherwise expressly stated.

EXAMPLE

To illustrate the advantages of the present invention, simulation models for a conventional fixed bed ammonia synthesis process of the prior art (Process A) and for an illustrative fluidized bed system representative of the present invention (Process B) were developed. Process A utilizes three fixed beds of catalyst in a horizontal reactor of the type described in the above-mentioned article by Quartilli and Wagner in *Hydrocarbon Processing*. Process B utilizes a fluidized catalyst bed in accordance with the practice of this invention. Calculations are based on a conventional iron based catalyst, obtained by fusing magnetite ($Fe_3O_4$) particles with alkali promoters and reducing the catalyst at elevated temperature, e.g., 600° to 1000° F. (316 to 538° C.) in hydrogen at a pressure of less than 30 psig. For comparison purposes of this Example, ammonia production rate, reaction pressure and gas space velocity through the respective catalyst beds are taken as the same in both cases A and B. Catalyst activity, reaction temperature, recycle gas rate and catalyst inventory are seen to differ in the respective cases A and B; the values for these operating variables are likewise set forth in the Table.

TABLE

| Process Parameters | Process A Fixed Bed | | Process B Fluidized Bed | |
|---|---|---|---|---|
| | Case 1A | Case 2A | Case 1B | Case 2B |
| Pressure: | | | | |
| psig | 3,050 | 1,500 | 1,500 | 926 |
| atmospheres | 207 | 100 | 100 | 63 |
| Space velocity, v/hr/v[a] | 16,000 | 2,000 | 2,000 | 2,000 |
| Catalyst particle size range | 3–6 mm[b] 1.5–3 mm[c] | 3–6 mm[b] 1.5–3 mm[c] | 0.06 mm | 0.06 mm |
| Catalyst inventory, tons | 121.5 | 972 | 726 | 972 |
| Catalyst relative activity (calculated) | 0.61 | 0.61 | 2 | 2 |
| Temperature, °F. | 750/920 | | 725 | |
| Flow rate, mols/hr: | | | | |
| Fresh feed[1] | 18,135 | 18,135 | 18,135 | 18,135 |
| Recycle[2] | 64,907 | 64,907 | 43,865 | 64,907 |
| Reactor feed[3] | 83,042 | 83,042 | 62,000 | 83,042 |
| Purge[4] | 1,298 | 1,298 | 1,298 | 1,298 |
| NH3 product[5] | 8,433 | 8,433 | 8,433 | 8,433 |
| Mol % NH3 | 13.2 | 13.2 | 17.7 | 13.2 |

TABLE-continued

| Process Parameters | Process A Fixed Bed | | Process B Fluidized Bed | |
|---|---|---|---|---|
| | Case 1A | Case 2A | Case 1B | Case 2B |
| in reactor outlet[6] | | | | |
| Mol % Inerts in reactor feed | 13.5 | 13.5 | 12.3 | 13.5 |

[a]Volume of gas flowed through bed, per hour, per volume of bed
[b]First fixed bed
[c]Second and third fixed beds
[1]Corresponds to line 7 of the Figure.
[2]Corresponds to line 8 of the Figure.
[3]Corresponds to line 2 of the Figure.
[4]Corresponds to line 18 of the Figure.
[5]Corresponds to line 17 of the Figure.
[6]Reactor outlet corresponds to line 5 of the Figure.

As shown by the tabulated data, Process B, which s representative of the present invention, shows considerable advantages over Process A, a typical prior art process utilizing a horizontal, fixed bed reactor. The temperatures within the fixed bed of Process A vary from 750° F. (399° C.) at the reactor inlet to 920° F. (493° C.) at the reactor outlet, a temperature gradient of 170° F. (94.4° C.). The synthesis temperature in Process B is 800° F. (427° C.) and is substantially constant throughout the reactor vessel, reflecting the substantially isothermal operation attainable by the process of the present invention. Temperature variations within the ammonia synthesis reactor have an adverse effect on ammonia yield as described, for example, in the text "An Investigation On Promoted Iron Catalysts For The Synthesis Of Ammonia" by Anders Nielsen of the Haldor Topsoe Research Laboratory. The lower pressures of Cases 1B and 2B of Process B as compared to Cases 1A and 2A of Process A provided considerable savings in reduced utilities cost and compressor and pressure vessel fixed costs, while providing the same quantity of ammonia product.

As is also well known in the art, a lower conversion rate, with the consequent higher recycle rate, increases the buildup of inerts in the feed. Such build-up decreases the thermodynamic equilibrium ammonia content as described above under the heading "Description Of The Related Art", in which the equilibrium ammonia content at a stated temperature and pressure is reduced from 27.8 mol percent to 22.7 mol percent by the inclusion of 10 mol percent inerts in the mixture.

It will also be observed that the catalyst inventory required in Process B is considerably less, about 30% less, than that required in the fixed bed catalyst system of Process A. Because of the much smaller particle size of the catalyst utilizeable in the fluidized bed system of Process B, and because of the isothermal operating conditions, the catalytic activity of the catalyst of Process B is conservatively calculated at more than about three times greater than that of the compositionally identical catalyst of Process A. For example, in the above-mentioned Nielsen article, if the activity of the catalyst of the Example having a particle size in the range of 0.3 to 0.8 mm is taken as 1.0, its use in the particle size range and under the conditions of Process A would show a relative catalytic activity of 0.6 whereas its use in the particle size range and under the conditions of Process B would show a relative catalytic activity of at least 2. (Relative catalytic activity is the ratio of space velocity of the reactant gases through the catalyst at a given conversion of reactants. For example, at identical conditions of temperature and pressure, if a catalyst whose a relative activity is taken as 1 gives 12% conversion of the reactants at 15,000 space velocity, a test catalyst which gives 12% conversion at 30,000 space velocity has a relative catalytic activity of 2.)

The foregoing improvements of the process systems illustrative of the present invention as compared to the conventional fixed bed system are, as shown, substantial and are primarily attributable to operating the reaction (a) at an optimum temperature level which is substantially uniform throughout the fluidized bed, and (b) with a more active catalyst for a given composition, due to the much finer catalyst particle used in the fluidized bed process of the present invention as compared to fixed bed processes.

Although the foregoing calculated comparison evidences specific improvements with regard to certain process variables, it is not essential to achievement of benefits accorded by the present invention to operate in the specific manner of the example. For example, in lieu of reducing the catalyst inventory relative to a comparable fixed bed system, it may be desirable in some instances to maintain a higher the catalyst inventory and thereby achieve a greater reduction in recycle gas rate. As another alternative, rather than taking reductions in recycle gas rate and/or catalyst inventory, a reduction in operating pressure below that required for fixed bed operation may be elected. Obviously, a combination of two or more such improvements may be selected.

Although the invention has been shown and described with respect to preferred illustrative embodiments, it will be apparent that numerous variations and other features are possible within the broad scope thereof, and accordingly, all apparent variations, modifications and embodiments are to be regarded as being within the spirit and scope of the present invention.

What is claimed is:

1. A process for producing ammonia, comprising:
   (a) contacting a synthesis gas mixture comprising hydrogen and nitrogen with a mass of solid, particulate ammonia synthesis catalyst under conditions to fluidize the mass of catalyst, and maintaining the catalyst mass in a fluidized state by a fluidization step consisting essentially of controlling the volumetric hourly flow rate of gas through the fluidized mass, and the pressure within the reaction zone;
   (b) passing the synthesis gas through a reaction zone in contact with the fluidized catalyst mass;
   (c) maintaining the reaction zone at an elevated temperature and at a pressure of from about 20 to 100 atmospheres to therein react hydrogen with nitrogen to form ammonia and provide a reacted synthesis gas stream; and
   (d) flowing the reacted synthesis gas stream from the reaction zone to an ammonia recovery zone and therein recovering from the reacted synthesis gas stream ammonia produced in the reaction zone to provide an ammonia product and an ammonia-depleted gas.

2. The process of claim 1 including maintaining the reaction zone at a pressure of from about 25 to 90 atmospheres.

3. The process of claim 1 including maintaining the reaction zone at a pressure of from about 30 to 70 atmospheres.

4. The process of claim 1 including removing entrained particulate catalyst from the reacted synthesis gas leaving the reaction zone by a catalyst recovery step consisting essentially of one or both of mechanical recovery and electrostatic recovery.

5. The process of claim 1 further comprising maintaining said fluidized bed under substantially isothermal conditions.

6. The process of claim 2 wherein said fluidized bed is maintained under substantially isothermal conditions by indirect heat transfer from said fluidized bed to a coolant medium.

7. The process of claim 1 wherein said solid catalyst is an activated iron catalyst.

8. The process of claim 1 wherein said solid particulate catalyst comprises particles having an average catalyst particle diameter of less than about 1.5 mm and a particle diameter size distribution such that at least about 90 weight percent of the particles have a diameter not greater than about 3 mm.

9. The process of claim 1 wherein said solid particulate catalyst comprises particles having an average catalyst particle diameter of less than about 0.25 mm and a particle diameter size distribution such that at least about 90 weight percent of the particles have a diameter not greater than about 0.5 mm.

10. The process of claim 1 including recycling the ammonia-depleted gas to the reaction zone.

11. A process for producing ammonia by reacting hydrogen and nitrogen in a synthesis gas in the presence of a solid particulate catalyst for the reaction, comprising:
   (a) contacting the synthesis gas with the catalyst in a reaction zone under conditions to maintain in said zone a fluidized catalyst bed by a fluidization step consisting essentially of (i) controlling the volumetric hourly flow rate of gas through the fluidized mass, and (ii) maintaining a pressure of from about 20 to 100 atmospheres in the reaction zone;
   (b) in said reaction zone, reacting a portion, but not all, of the hydrogen and nitrogen content of the synthesis gas to form ammonia;
   (c) withdrawing the resultant ammonia-containing, reacted synthesis gas from the reaction zone and separating ammonia therefrom to provide an ammonia-depleted synthesis gas and an ammonia product; and
   (d) recycling the resultant ammonia-depleted synthesis gas to the reaction zone and concurrently introducing fresh synthesis gas to the reaction zone.

12. The process of claim 11 including maintaining a pressure of from about 30 to 70 atmospheres in the reaction zone.

13. The process of claim 11 including maintaining a temperature of from about 600° F. (315.6° C.) to about 1100° F. (593.3° C.) in the reaction zone.

14. The process of claim 13 including maintaining a pressure of from about 30 atmospheres to 70 atmospheres in the reaction zone.

15. The process of claim 11 including cooling the fluidized bed by indirect heat exchange with a coolant.

16. The process of claim 11 wherein said particulate catalyst comprises an iron catalyst.

17. The process of claim 11 wherein said solid particulate catalyst comprises particles having an average particle diameter of less than about 1.5 mm and a particle diameter size distribution such that at least about 90 weight percent of the particles have a diameter not greater than about 3 mm.

18. The process of claim 11 wherein said solid particulate catalyst comprises particles having an average catalyst particle diameter of less about 0.25 mm and a particle diameter size distribution such that at least about 90 weight percent of the particles have a diameter not greater than about 0.5 mm.

19. The process of claim 11 including removing entrained particulate catalyst from the reacted synthesis gas leaving the reaction zone by a catalyst recovery step consisting essentially of one or both of mechanical recovery and electrostatic recovery.

* * * * *